US010380632B2

(12) United States Patent
Moore et al.

(10) Patent No.: US 10,380,632 B2
(45) Date of Patent: Aug. 13, 2019

(54) SYSTEMS AND METHODS FOR ADVERTISING ON VIRTUAL KEYBOARDS

(71) Applicant: OverSignal, LLC, Stanwood, WA (US)

(72) Inventors: Brian Moore, Stanwood, WA (US); Keith Senator, Covington, GA (US); Matthew McCutchen, Shoreline, WA (US)

(73) Assignee: OverSignal, LLC, Renton, WA (US)

( * ) Notice: Subject to any disclaimer, the term of this patent is extended or adjusted under 35 U.S.C. 154(b) by 227 days.

(21) Appl. No.: 15/453,559

(22) Filed: Mar. 8, 2017

(65) Prior Publication Data

US 2018/0025382 A1    Jan. 25, 2018

Related U.S. Application Data

(63) Continuation-in-part of application No. 15/316,095, filed as application No. PCT/US2015/034300 on Jun. 4, 2015, and a continuation-in-part of application No. 14/758,786, filed as application No. PCT/US2014/010252 on Jan. 3, 2014, now abandoned, application No. 15/453,559, which is a continuation of application No. 13/842,617, filed on Mar. 15, 2013, now abandoned.

(60) Provisional application No. 62/007,890, filed on Jun. 4, 2014, provisional application No. 61/748,718, filed on Jan. 3, 2013, provisional application No. 61/748,721, filed on Jan. 3, 2013.

(51) Int. Cl.
G06Q 30/02    (2012.01)
G06F 3/0484   (2013.01)
G06F 3/0488   (2013.01)

(52) U.S. Cl.
CPC ..... *G06Q 30/0251* (2013.01); *G06F 3/04842* (2013.01); *G06F 3/04883* (2013.01); *G06F 3/04886* (2013.01); *G06Q 30/0255* (2013.01); *G06Q 30/0267* (2013.01); *G06F 2203/04105* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 2007/0150573 A1* | 6/2007 | Kitchen | ................ | G06Q 30/02 709/223 |
| 2009/0027346 A1* | 1/2009 | Srivastava | ............ | G06F 3/0238 345/169 |
| 2010/0257552 A1* | 10/2010 | Sharan | .................... | G06Q 30/02 725/34 |
| 2010/0275163 A1* | 10/2010 | Gillespie | ............... | G06F 3/0481 715/810 |
| 2012/0130822 A1* | 5/2012 | Patwa | ................ | G06Q 30/0273 705/14.69 |

(Continued)

*Primary Examiner* — Vincent M Cao
(74) *Attorney, Agent, or Firm* — Perkins Coie LLP

(57) ABSTRACT

Methods and systems are disclosed for interacting with advertisements on a virtual keyboard. An advertisement appears in a position that is proximate to a virtual key of the virtual keyboard. A user can manipulate the advertisement based on performing one or more types of gestures or key presses on or near the virtual keys. One type of gesture triggers an interaction with the advertisement and another type of gesture or key press performs a standard keyboard function.

21 Claims, 5 Drawing Sheets

(56) References Cited

U.S. PATENT DOCUMENTS

| | | | | |
|---|---|---|---|---|
| 2012/0131454 A1* | 5/2012 | Shah | G06F 3/04883 | 715/702 |
| 2012/0235921 A1* | 9/2012 | Laubach | G06F 3/0238 | 345/172 |
| 2013/0166393 A1* | 6/2013 | Lee | G06Q 30/0267 | 705/14.69 |
| 2014/0198062 A1* | 7/2014 | Kreutzer | G06F 1/1643 | 345/173 |
| 2014/0297410 A1* | 10/2014 | Mandel | G06Q 30/02 | 705/14.54 |
| 2015/0046263 A1* | 2/2015 | Seo | G06Q 30/02 | 705/14.64 |
| 2015/0084871 A1* | 3/2015 | Yarvis | G06F 3/0238 | 345/172 |
| 2015/0089429 A1* | 3/2015 | Ghassabian | G06F 3/04886 | 715/773 |

* cited by examiner

SYSTEMS AND METHODS FOR ADVERTISING ON VIRTUAL KEYBOARDS

CROSS REFERENCE TO RELATED APPLICATIONS

This is a continuation of U.S. patent application Ser. No. 13/842,617, filed on Mar. 15, 2013, entitled "SYSTEMS AND METHODS FOR ADVERTISING ON VIRTUAL KEYBOARDS," which claims benefit of U.S. Provisional Patent Application No. 61/748,718, filed on Jan. 3, 2013, entitled, "SYSTEMS AND METHODS FOR ADVERTISING ON VIRTUAL KEYBOARDS." This application is also a continuation-in-part of U.S. application Ser. No. 14/758,786, filed on Jun. 30, 2015, entitled "SYSTEMS AND METHODS FOR ADVERTISING," which is a 371 of PCT/US2014/010252, filed on Jan. 3, 2014, entitled "SYSTEMS AND METHODS FOR ADVERTISING," which claims benefit of U.S. Provisional Patent Application No. 61/748,721, filed on Jan. 3, 2013, entitled "SYSTEMS AND METHODS FOR ADVERTISING," and is also a continuation-in-part of U.S. application Ser. No. 15/316,095, filed on Dec. 2, 2016, entitled "SYSTEMS, APPARATUSES AND METHODS FOR USING VIRTUAL KEYBOARDS," which is a 371 of PCT/US2015/034300, filed on Jun. 4, 2015, entitled "SYSTEMS, APPARATUSES AND METHODS FOR USING VIRTUAL KEYBOARDS," which claims benefit of U.S. Provisional Patent Application No. 62/007,890, filed on Jun. 4, 2014, entitled "SYSTEMS AND METHODS OF USING VIRTUAL KEYBOARDS," the contents of which are incorporated by reference in their entireties.

BACKGROUND

Online advertising generates a large amount of online traffic and revenue. Online advertisements are a nearly ubiquitous feature of our online experience because online advertisers typically advertise goods and services on or with websites, mobile apps, video games, set-top boxes, streaming media, and so on. In many cases, advertisements may be targeted to users based on, for example, demographic information, online activities, search activities (e.g., search queries), online shopping activities, and so on. Online advertisements may take the form of one or more pop-up advertisements, pop-under advertisements, banner advertisements, audio advertisements, video advertisements, animated gifs, and so on. Desktop computers, which typically include computer monitors, can offer relatively vast amounts of space for displaying or presenting advertisements. Handheld devices, however, typically provide a limited amount of visual display space or real estate for users to view or interact with, necessarily making online advertisements either annoyingly large, or small and difficult to interact with. When the visual space available for online advertisements is limited, online advertisements may interfere with a user's online experience. For example, a pop-up advertisement may be displayed in such a way that it completely takes over the viewable area of the user's device. As another example, the user may accidentally click on or select the advertisement if the advertisement is displayed over or near a feature of a webpage or application with which the user interacts.

DETAILED DESCRIPTION

Figure 1:
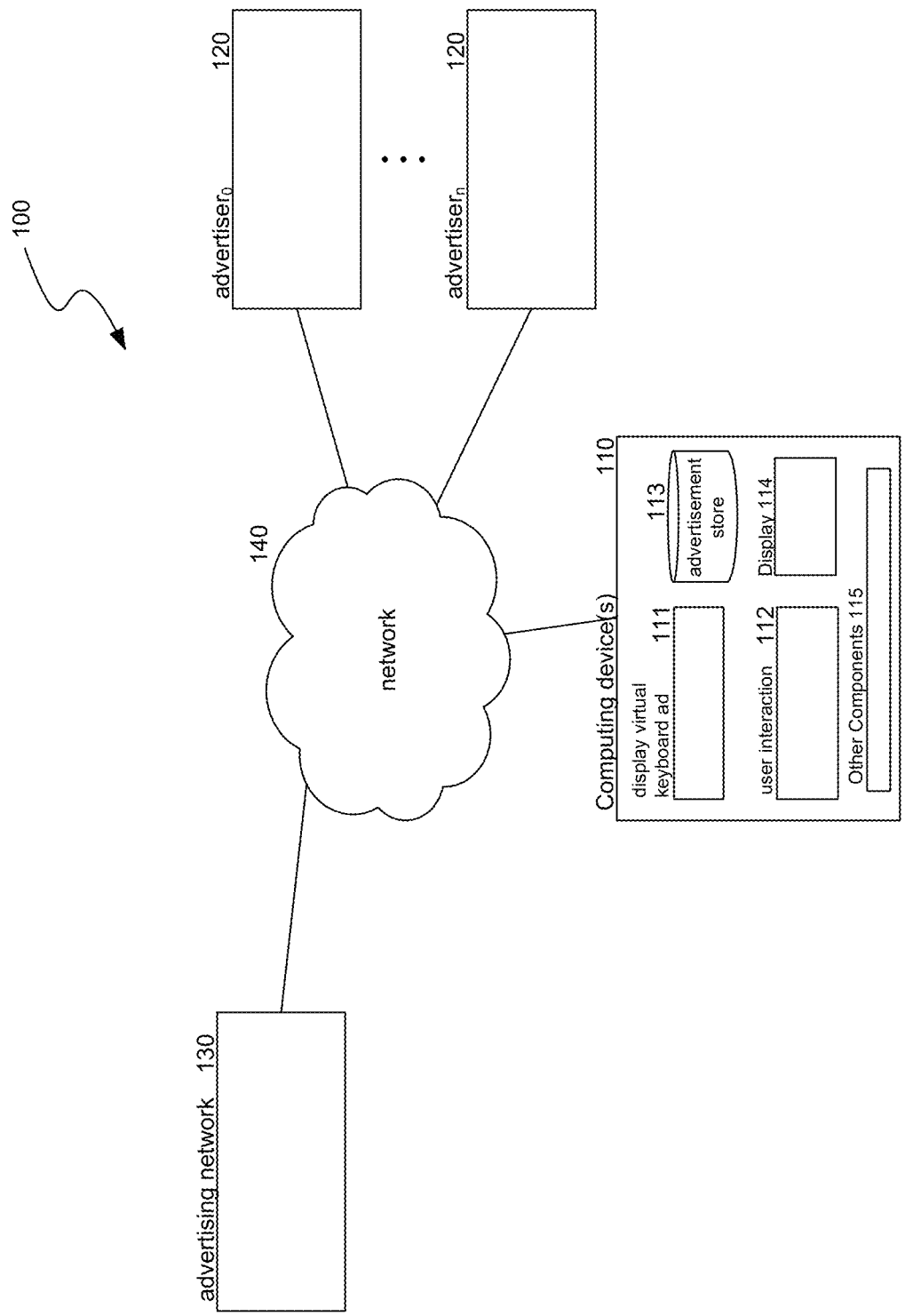
FIG. 1 is a block diagram illustrating an environment in which the disclosed techniques may operate.

Systems and methods for providing non-obtrusive techniques for presenting advertisements (e.g., an advertisement impression) to users of mobile devices, such as mobile telephones, tablets, smart phones, laptops, TVs, and other devices with limited display space. In some embodiments, the disclosed techniques display advertisements as part of or otherwise associated with a virtual keyboard displayed on the device. For example, a visual advertisement may be displayed as part of a spacebar or other key or keys of a virtual keyboard. In other words, the graphical representation of the spacebar (or another key or keys) may for example, be replaced by, blended (e.g., alpha compositing techniques) or otherwise modified with a graphical advertisement, such as a banner ad. Although the graphical representation of the visual spacebar is modified, the functionality of the spacebar may remain the same. For example, a user can continue to use the virtual keyboard and its associated keys to interact with the mobile device, (e.g., to type a message across the Internet, interact with an application (App), etc.) while the advertisement is display. In this manner, advertisements are presented in a less-intrusive or non-intrusive manner. Furthermore, user interactions with advertisements can be tracked across multiple websites or web access points, across multiple mobile device functions (e.g., mobile applications, email, text messaging, iMessaging, posts, searches, social network interactions), and across multiple devices.

In some embodiments, the disclosed techniques may allow a user to interact with a displayed advertisement using various gestures. For example, a user may be able to activate an advertisement displayed in place of or in addition to one or more keys of a virtual keyboard by performing a swipe gesture in a variety of directions, such as up, down, left or right. A swipe gesture, for example, can reduce the number unintentional "clicks" on or near the advertisement, thereby increasing the likelihood that activations of advertisements are intentional. By activating the advertisement, in some embodiments, a user is directed to one or more websites, applications, and/or files (e.g., media files, video files, or audio files) for or associated with, for example, the advertiser. Furthermore, the user may be able to perform other actions based on one or more swipe gestures in various directions, such as down or to the left. For example, in some embodiments, one or more swipes to the virtual keyboard can forward the advertisement to another user; save the advertisement; follow the associated advertiser on a social network site (e.g., TWITTER®); share the advertisement or associated advertiser (e.g., company) on a social networking site (e.g., FACEBOOK®, PINTEREST®, etc.); "like" (e.g., performing a binary-like approval or disapproval) the advertisement; and or rate the advertisement. The inventors have found that rating an advertisement has several advantages over "liking" the advertisement. For example, "likes" can be arbitrary. You may "like" something because: a friend requested you to do so, you actually do like it, or for any number of reasons. Ratings offer a much more accurate picture of what a brand, product, or company means to a person. For example, ranking an advertisement, in some embodiments, allows the advertisement to be marked as irrelevant, offensive, and or removed from future advertisements from a particular company or a particular type of advertisement.

In some embodiments, the disclosed techniques display advertisements at a mobile user device based on identifying one or more actions to associate with virtual key(s) proximate to the advertisement. The disclosed technique can detect and react to a selection of virtual key(s) based on one or more selection types. For example, a first selection type (e.g., a user gesture, eye movement, etc.) initiates (i.e., triggers) a first action for interacting with advertisement(s) (e.g., scroll through advertisements, open an advertisement in a new window, open a website, buy a good/service, etc.) and a second action (e.g., a non-gesture-based action, such as pressing a virtual 'A' key) initiates display of a representation of a symbol, character, or alphanumeric value associated with the selected virtual key (e.g., an '%,' 'A, '5', etc.), for example. In some embodiments, a first gesture (e.g., a swipe) and a second, different gesture (e.g., an 'L'-shaped gesture) performed proximate to the same advertisement initiate different actions. For example, a swipe across an advertisement may cause a display of more information regarding about that advertisement and a 'L'-shaped gesture performed proximate to that same advertisement may minimize the advertisement to a portion of a display, save the advertisement for later, or send the advertisement to a friend, etc.

In some embodiments, the virtual keyboard is projected from a laser, LED, infrared component, or other transfer medium to form a 2D or pseudo 3D image of the virtual keyboard. For example, the disclosed techniques can cause a mobile device to focus light in the shape of a keyboard onto a surface, such as a table, All or some of techniques mentioned above and further discussed below (e.g., user based gestures to interact with advertisements) equally apply to projected virtual keyboards.

In some embodiments, the virtual keyboard provides feedback, such as a sound, light, one or more signals to an external device, or haptic feedback. For example, a virtual key (e.g., a space bar) of the virtual keyboard may display a picture of a Chevy Camaro. When the advertisement is touched, haptic feedback (e.g. a force, motion, and or vibration) may provide, via one or more of the virtual keys, the feeling that the Camaro's engine is revving, for example. Feedback, in some embodiments, is incorporated in situations where two or more users are in the same location experiencing advertisements related to a television program or "app" that they were participating in. For example, feedback can indicate that time is running out to input of an answer via the virtual keyboard.

In some embodiments, the described techniques aggregate information from different sources (e.g., remote networks, websites, advertisement services, a user profile, user history, cached data) to increase the accuracy and efficiency in targeting advertisements to a user. For example, when the virtual keyboard is used to fill-in a textbox on a website, navigate an online/local website, make a phone call, compose a message, etc., data from one or more of those sources can be used to refine and tailor a new add to target the user. The inventors have contemplated other techniques to refine and target advertisement, such as receiving an indication that an advertisement was selected via a separate virtual keyboard operated by the same or a different user; refining the information based on target data from an advertiser; and or refining the information based on one or more user preferences, user history, or tracking data.

FIG. 1 is a block diagram illustrating a computing environment 100 in which the disclosed techniques may operate in some embodiments. In this example, computing environment 100 includes one or more computing device(s) 110, advertisers 120, advertising network 130, and network 140. User computing environment 110 includes, in some embodiments, display virtual keyboard ad component 111, user interaction component 112, and advertisement store 113. Display virtual keyboard advertisement component 111 can be invoked to display an advertisement on or as part of a virtual keyboard. User interaction component 112 is invoked to process user interactions with an advertisement displayed on or as part of a virtual keyboard. Advertisement store 113 stores advertisements and associated information (e.g., number of times an ad is displayed, rate of display, time of day information for the advertisement, timeout duration, expiration date/time) received from advertisers 120, advertising network 130, etc. Advertisers 120 can represent companies or other entities that generate advertisements. Advertising network 130 can be a company or entity that targets and distributes advertisements to users on behalf of advertisers based on, for example, geographic area (e.g., city location, country, etc.), time, user data, demographic information, user preferences, and so on. In other embodiments, the advertising network 130 can be operated by a manufacture of the user computing device(s) 110 or a distributor of the user computing device 110. Computing device(s) 110, advertisers 120, and advertising network 130 are connected and may communicate via network 140.

The computing device(s) on which the disclosed techniques may be implemented can include a screen (e.g., a touch screen), a central processing unit, memory, input devices (e.g., keyboards, virtual keyboards, touchscreens, and pointing devices), output devices (e.g., display devices) 114, storage devices (e.g., disk drives), and various other software and/or hardware components 115. The memory and storage devices are computer-readable storage media that may be encoded with computer-executable instructions that implement the technology, which means a computer-readable storage medium that stores the instructions. In addition, the instructions, data structures, and message structures may be transmitted via a computer-readable transmission medium, such as a signal on a communications link. Thus, "computer-readable media" includes both computer-readable storage media for storing information and computer-readable transmission media for transmitting information. Additionally, data used by the disclosed techniques may be encrypted. Various communications links may be used, such as the Internet, a local area network, a wide area network, a point-to-point dial-up connection, a cell phone network, wireless networks, and so on.

Figure 2:
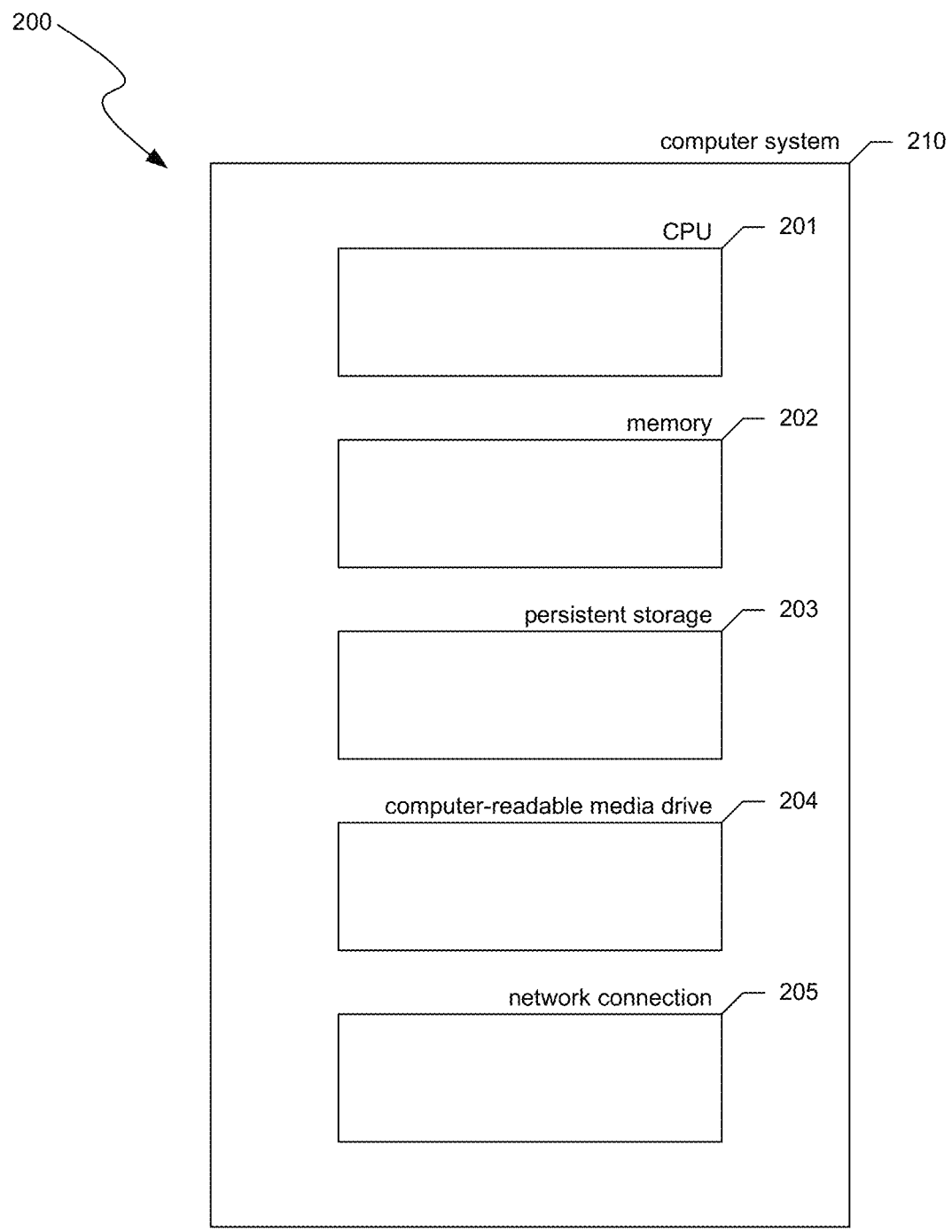
FIG. 2 is a block diagram showing some of the components incorporated in associated computing systems.

FIG. 2 is a block diagram 200 showing some of the components 201-205 incorporated in associated computing system(s) 210 (e.g. advertisement network 130, advertisers 120, and or user computing device(s) 110, etc.) in some embodiment. Computer system 210 comprises one or more central processing units ("CPUs") 201 for executing computer programs; a computer memory 202 for storing programs and data while they are being used; a persistent storage device 203, such as a hard drive for persistently storing programs and data; a computer-readable media drive 204, such as a CD-ROM drive, for reading programs and data stored on a computer-readable storage medium; and a network connection 205 for connecting the computer system 210 to other computer systems, such as via the Internet.

While computer systems 210 configured as described above are suitable to support the operation of the disclosed technology, those skilled in the art will appreciate that the techniques may be implemented using devices of various types and configurations. Moreover, communications to and from the CPU 201 and on data buses and lines can be encrypted to protect against snooping of internal data.

The disclosed technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments, including cloud-based implementations.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

The technology can also be practiced in distributed environments, where tasks or modules are performed by remote processing devices linked through a communications network. In a distributed computing environment, program modules or subroutines may be located in local and remote memory storage devices. Aspects of the technology described herein may be stored or distributed on computer-readable media, including magnetic or optically readable or removable computer disks. Furthermore, aspects of the technology may be distributed electronically over networks. Data structures and transmissions of data particular to aspects of the technology are also encompassed within the scope of the technology.

Figure 3:
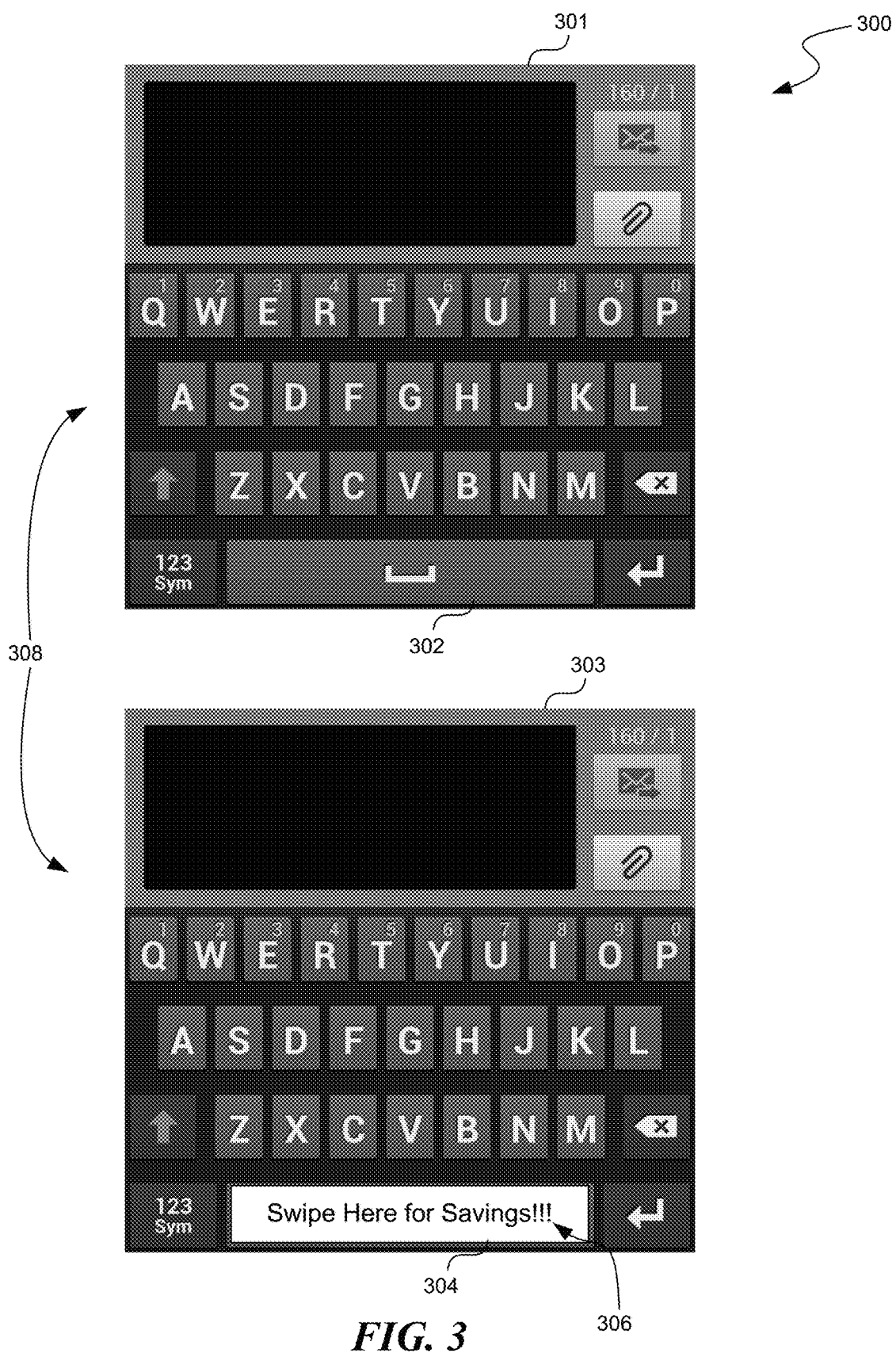
FIG. 3 is a display page representing two screenshots of a virtual keyboard.

FIG. 3 is a depiction 300 of two example screenshots 301 and 303 of a virtual keyboard 308 on display 114, for example. For example, each of screenshots 301 and 303 include a virtual keyboard including a virtual spacebar 302-304. In screenshot 301, virtual spacebar 302 is displayed without an advertisement 306. The virtual spacebar 302 is configured to provide a relatively large area to display an advertisement 306. In screenshot 303, virtual spacebar 302 is displayed with an advertisement 306 inviting the user to "Swipe Here for Savings!!!" Although the advertisement 306 is displayed over virtual spacebar 302, a user may still enter space characters by pressing on or clicking the advertisement/spacebar. The user may interact with the advertisement by, for example, performing a swipe or other gesture at or near the advertisement. Although in this example the advertisement 306 is displayed in the vicinity of the virtual spacebar 302, one or more advertisements 304 may be displayed at any location on the virtual keyboard. For example, one advertisement (e.g., advertisement 304) may span the 'W,' 'E,' 'R,' 'T,' 'S,' 'D,' 'F,' 'Z,' 'X,' and 'C,' keys while another advertisement (not shown) spans the Y,' 'U,' 'I,' 'O,' 'H,' 'J,' 'K,' 'B,' 'N,' and 'M' keys. In this manner, the disclosed techniques can present advertisements to users without interfering with the user's ability to interact with the virtual keyboard 308 and associated computing device(s) 110. The virtual keyboards 308 can be part of an operating system (e.g., iOS, Android® Operating System, Blackberry operating system, or Microsoft Windows® operating system). In other embodiments, an application is installed to provide the virtual keyboard 308. The advertising functionality can be part of the virtual keyboard software or installed separately.

Figure 4:
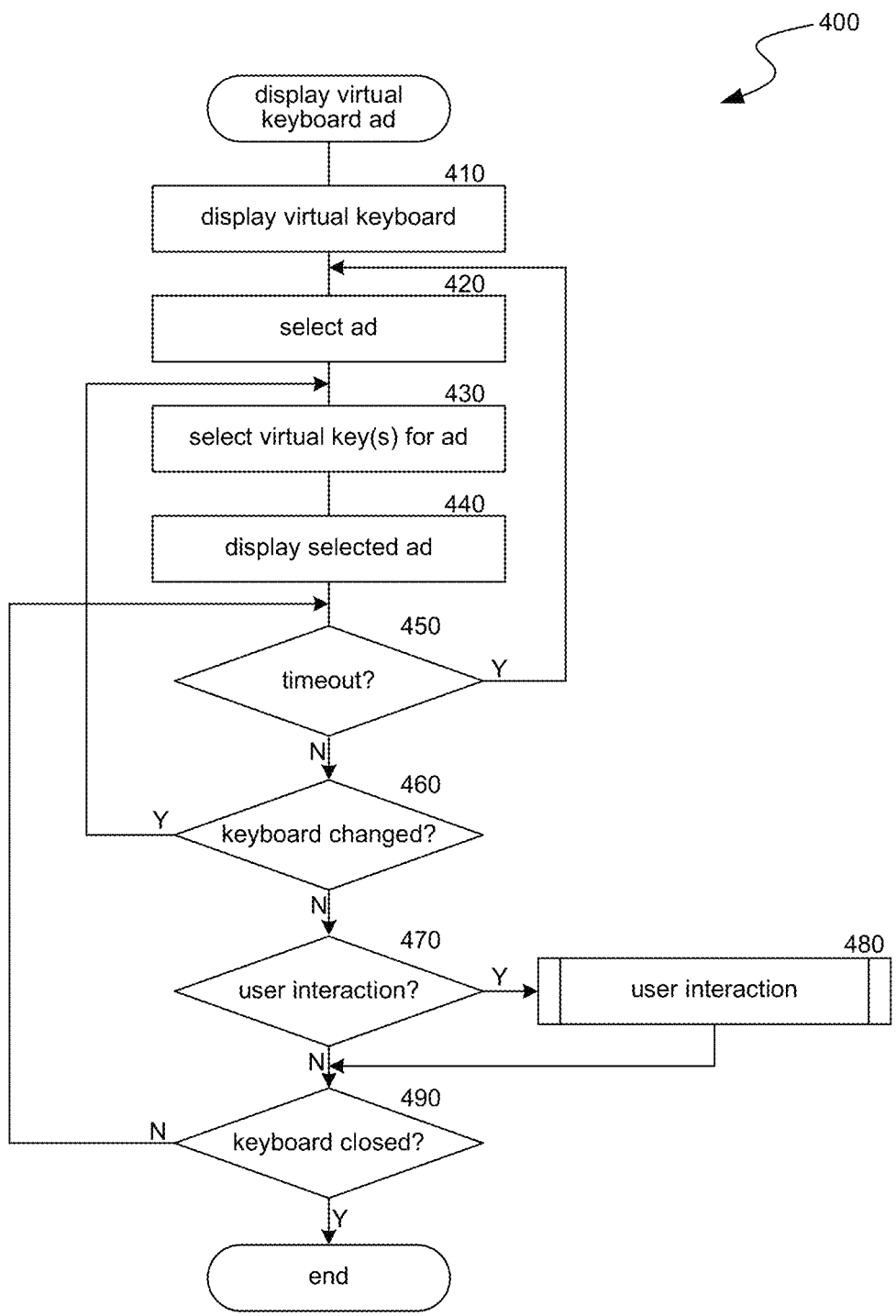
FIG. 4 is a flow diagram illustrating the processing of a display virtual keyboard ad component.

FIG. 4 is a flow diagram 400 illustrating the processing of a display virtual keyboard advertisement component 111 in some embodiments. In block 410, the display virtual keyboard advertisement component 111 (e.g. 308) displays a virtual keyboard 308. In block 420, the display virtual keyboard advertisement component 111 selects an advertisement for display. Selection of the advertisement 308 may be based on demographic information of one or more users, of the computing environment 100, recent activity of one or more users, user preferences, and so on. For example, if a user is watching a television program on a smartTV and an advertisement or "product placement" for a particular product was recently displayed, the display virtual keyboard advertisement component 111 may select an advertisement 306 for the same or a similar product for display on another user computing device 110, such as the user's mobile telephone. In some embodiments, the display virtual keyboard advertisement component 111 may request an advertisement 306 from an advertising network 130 or advertiser 120. In block 430, the display virtual keyboard advertisement component 111 selects one ore more virtual key(s) on the virtual keyboard 308 to display a selected ad. The display virtual keyboard advertisement component 111 may select virtual key(s) on the virtual keyboard 308 based on the shape of the advertisement, the virtual keyboard shape, virtual key layout, and availability of virtual keys that are currently displayed, user preferences, and so on. For example, if the selected advertisement (e.g., advertisement 306) is in the shape of a vertically long rectangle, the display virtual keyboard advertisement component 111 may select the virtual spacebar 302 for displaying advertisement 304. However, if the advertisement 306 is a square, the display virtual keyboard advertisement component 111 for example, may select virtual key(s) that approximate a square. Additionally and or alternatively, a user and or the display virtual keyboard advertisement component 111 may specify a preference for displaying advertisements (e.g., advertisement 306) on certain virtual keys or not displaying advertisements on certain virtual keys. For example, a user may specify that advertisements 306 should never be displayed on virtual keys other than the virtual spacebar 302. Accordingly, the display virtual keyboard advertisement component 111 will avoid displaying advertisements on those virtual keys. In some embodiments, advertisements 306 may include multiple representations (e.g., shapes, sizes, colors) so that the display virtual keyboard advertisement component 111 can more easily identify virtual keys capable of displaying the advertisement 306. In block 440, the display virtual keyboard advertisement component 111 displays a selected advertisement on or in combination with the selected virtual keys. For example, the display virtual keyboard advertisement component 111 may display the advertisement 306 over certain virtual keys or blend (e.g., alpha compositing techniques) the advertisement 306 with the image data associated with the selected key(s). As another example, the display virtual keyboard advertisement component 111 may display the advertisement 306 over the virtual keys but texture the advertisement so that the corresponding virtual keys appear as "bumps" under the advertisement 306. In decision block 450, if the displayed advertisement (e.g., advertisement 306) has timed out then the display virtual keyboard advertisement component 111 loops back to block 420 to select another advertisement, else the display virtual keyboard advertisement component 111 continues at block 460. For example, advertisements 306 may specify a "time out" duration (e.g., 30 seconds, 60 seconds, 5 minutes) so that the advertisements 306 are periodically updated. Accordingly, while a user is typing a message and or making a gesture the user may be presented with multiple advertisements. In decision block 460, if the virtual keyboard 308 has changed then the display virtual keyboard advertisement component 111 loops back to block 430 to select virtual key(s) for the selected advertisement (e.g., advertisement 306), else the display virtual keyboard advertisement component 111 continues at decision block 470. For example, if the user has shifted to another virtual keyboard with a different layout or a different set of virtual keys, the display virtual keyboard advertisement component 111 will loop back to select key(s) for displaying the advertisement 306. In decision block 470, if the user has interacted with the displayed advertisement 306 (as opposed to the underlying or associated key), then the display virtual keyboard advertisement component 111 continues at block 480 to invoke a user interaction component 112, else the display virtual keyboard advertisement component 111 continues at decision block 490. In decision block 490, if the virtual keyboard 308 is closed, then processing of the display virtual keyboard advertisement component 111 completes, else the display virtual keyboard advertisement component 111 loops back to decision block 450 to determine whether the advertisement 306 has timed out.

Figure 5:
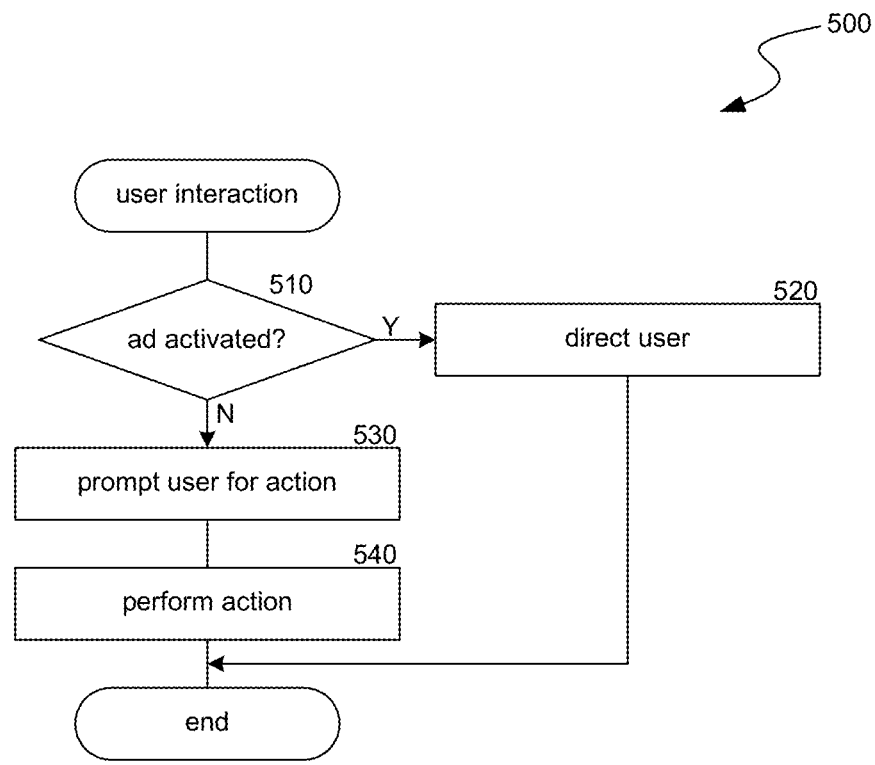
FIG. 5 is a block diagram illustrating the processing of a user interaction component.

FIG. 5 is a block diagram 500 illustrating an example of a user interaction component 112 in some embodiments. In decision block 510, if user interaction is an activation of the advertisement, (e.g., 306) for example, then the user interaction component 112 continues at block 520, else the user interaction component 112 continues at block 530. For example, the user interaction component 112 may be configured to detect certain actions and or gestures (e.g., swipe to the right) as an "activation" of an advertisement 306 or an interest to view more information associated with the advertisement 306, and or other features associated with advertisement 306. In other embodiments, one or more actions and or gestures (e.g., swipe to the left) are detected by the user interaction component 112 as non-activation interaction such as a selection of the advertisement 306 but no present interest in following the advertisement 306. In block 520, the user is directed to a local and or remote media file, for example, or site or location associated with the advertisement 308, such as a website, mobile application, video, audio recording, etc. For example, the user interaction component 112 may display a video over the virtual keyboard or in place of an advertisement 308 displayed with the virtual keyboard 308. As another example, the user interaction component 112 may launch a browser directing the user to the advertiser's 120 website. Alternatively, the user interaction component 112 may initiate a "buy now" command for an advertised product or service, open a shopping cart, initiate a vote or survey response, open a full screen advertisement, and so on. In some examples, the user interaction component 112 may prompt the user to select an action to take with respect to the advertisement 308. In block 530, the user interaction component 112 prompts the user for an action, such as saving the advertisement 308 for later use, forwarding the advertisement to another user, "liking" or sharing the advertisement 308 or advertiser 120 on a social networking site, etc. In block 540, the user interaction component 112 performs an action selected by the user and or determined by the computing environment 100 and then ends. In various embodiments, other actions are taken in response to a user interaction with an advertisement 308. For example, opening an advertisement 308 in another window, activating an advertisement in a window of a messaging screen, morphing the virtual keyboard 308 to a video or image, claiming a product or prize, ordering or bidding on a good or service, entering a raffle or drawing, printing a coupon, "liking" a tv show, voting for a contestant (e.g., Dancing with the Stars, America's Got Talent, X Factor), reporting ratings for television programs, purchasing a product via a website, such as Groupon, Living Social, etc. and so on. In some cases, an advertisement 308 may be static such that a user interaction with the advertisement 306 is ignored.

The embodiments disclosed herein can be used to display various advertisement types (e.g., logos, text, graphics, images, etc.) or other information (e.g., information about operation of user computing device 110, time, etc.). The advertisement 306 can have one or more inactive areas and one or more active areas (e.g., a button, an activation icon, etc.). A user can contact the inactive area without activating the advertisement 306 and can activate the advertisement 306 by contacting the active area. The advertisements can be displayed continuously or at intervals (e.g., preset intervals, user defined intervals, intervals determined based on user input, etc.). Virtual keyboard 308 can be used to enter characters (e.g., numbers, letters, punctuation, etc.) via a touch screen, for example. Touch screens can display different types of keyboards (e.g., a standard keyboard layout, a customized keyboard layout, etc.) such that a user can contact key images of the displayed keyboard image. A user can touch-type on the displayed keys similar to a physical keyboard.

In some embodiments the computing environment 100 collects data via the virtual keyboard 308 and/or other user input. Displaying advertisements 308 can be controlled based on type data. For example, computing device(s) 110 can cycle through numerous advertisements while a user composes a text message, an email, interact with a webpage, video or the like. Additionally or alternatively, collected data can be used to more accurately target users with new advertisements based on one or more users' interaction history and can capture analytics across multiple platforms and user computing device(s) 110.

The computing environment 100 in various embodiments, stores, forwards, or otherwise alters advertisements. In one embodiment, an advertisement 306 is stored for later viewing and/or interaction. The advertisement 306 can also be sent (e.g., forwarded) to another user computing device 110 (e.g., another individual's smart phone). The advertisement 306 or associated company can be "liked" on FACEBOOK® or otherwise associated with other websites (e.g., social website), programs, apps, etc.

Virtual keyboards and/or advertisements can be controlled, in some embodiments, based on program settings, operating system settings, or the like. The user and or computing environment 100 can select a desired language (e.g., English, Spanish, French, Chinese, etc.) to be displayed by, for example, the virtual keyboard and/or advertisement. The virtual keyboard can be integrated into or part of an operating system such that its settings can be modified using the operating system settings. The operating system can select and/or deliver advertisements with cultural relevancy, language relevancy, or the like. User data can also be enhanced by knowing languages used by the user. The user data can be associated with the user's profile and analyzed with other data (e.g., geographic location, demographic information, online activities, search activities, online shopping activities, etc.). The user data can be analyzed based on the settings/profiles and can be used to determine appropriate advertising.

Profiles can also be used to deliver relevant advertisements via the virtual keyboard. A profile can associate one user computing device(s) 110 (e.g., a smartphone, Smart TV, a gaming system such as an Xbox, etc.) with a different user computing device(s) 110 such that either or both user computing device(s) 110 can display an advertisement 306 selected via either user computing device 110. In some embodiments, a profile can associate login information or other user inputted data to the user, or one or more user computing device(s) 110.

CONCLUSION

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. U.S. patent application Ser. No. 13/842,617, filed on Mar. 15, 2013, entitled "SYSTEMS AND METHODS FOR ADVERTISING ON VIRTUAL KEYBOARDS," U.S. Provisional Patent Application No. 61/748,718, filed on Jan. 3, 2013, entitled, "SYSTEMS AND METHODS FOR ADVERTISING ON VIRTUAL KEYBOARDS," U.S. application Ser. No. 14/758,786, filed on Jun. 30, 2015, entitled "SYSTEMS AND METHODS FOR ADVERTISING," PCT App. No. PCT/US2014/010252, filed on Jan. 3, 2014, entitled "SYSTEMS AND METHODS FOR ADVERTISING," U.S. Provisional Patent Application No. 61/748,721, filed on Jan. 3, 2013, entitled "SYSTEMS AND METHODS FOR ADVERTISING," U.S. application Ser. No. 15/316,095, filed on Dec. 2, 2016, entitled "SYSTEMS, APPARATUSES AND METHODS FOR USING VIRTUAL KEYBOARDS," PCT App. No. PCT/US2015/034300, filed on Jun. 4, 2015, entitled "SYSTEMS, APPARATUSES AND METHODS FOR USING VIRTUAL KEYBOARDS," and U.S. Provisional Patent Application No. 62/007,890, filed on Jun. 4, 2014, entitled "SYSTEMS AND METHODS OF USING VIRTUAL KEYBOARDS" are all incorporated by reference in their entireties. The elements and acts of the various embodiments described herein, including incorporated by reference applications, can be combined to provide further embodiments.

These and other changes can be made to the described technology in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

We claim:

1. A computer-implemented method for displaying advertisements, comprising:

receiving one or more advertisements at a device including a display screen;

displaying a virtual keyboard on the display screen;

determining one or more virtual keys of the virtual keyboard for associating with a specific advertisement of the one or more advertisements;

displaying a portion of the specific advertisement at a position proximate to the determined one or more virtual keys of the virtual keyboard;

identifying one or more actions to associate with the one or more virtual keys proximate to the one or more advertisements;

associating the one or more actions with the one or more virtual keys proximate to the one or more advertisements;

detecting a selection of one or more of the virtual keys, wherein the selection is associated with a selection type; and initiating the one or more actions associated with the selected one or more virtual keys proximate to the one or more advertisements, based on at least the selection type.

2. A computer-implemented method of claim 1, wherein a first selection type causes an initiation of a first action and a second selection type causes an initiation of a second action,
wherein the first selection type is a gesture and the second selection type is a key press,
wherein the first action is associated with interacting with the one or more advertisements corresponding to the selected one or more virtual keys, and
wherein the second action is associated with initiating display of a representation of a symbol, character, or alphanumeric value associated with the selected one or more virtual keys.

3. The computer-implemented method of claim 1, wherein a first action is initiated based on a first gesture type and a second action is initiated based on a second gesture type.

4. The computer-implemented method of claim 3, wherein the first and the second gestures are made proximate to the same advertisement.

5. The computer-implemented method of claim 1, wherein the determination of the one or more virtual keys of the virtual keyboard is based on a shape of the one or more virtual keys, a size of the advertisement, an advertisement type, user data, or advertiser preference.

6. The computer-implemented method of claim 1, further comprising, displaying at the virtual keyboard a next advertisement of the one or more advertisements, based on receiving substantially similar gestures.

7. The computer-implemented method of claim 1, wherein the virtual keyboard is a 2D or pseudo 3D image projected on a surface.

8. The computer-implemented method of claim 1, further comprising displaying a targeted advertisement based on data aggregated from navigating one or more online sources via the virtual keyboard.

9. The computer-implemented method for displaying advertisements of claim 1, further comprising providing feedback in response to the detected selection of the one or more of the virtual keys.

10. A computer-readable storage medium storing instructions that, if executed by a computing system, cause the computing system to perform operations for displaying advertisements on a virtual keyboard, comprising:
receiving an indication of a selection of one or more advertisements displayed at a position proximate to one or more keys of a virtual keyboard;
in response to receiving the indication, identifying information associated with the selected one or more advertisements, wherein the information is targeted at a user of the virtual keyboard; and
sending the information for display at the virtual keyboard.

11. The computer-readable storage medium of claim 10, further comprising refining the information based on at least one other indication received via the virtual keyboard.

12. The computer-readable storage medium of claim 10, further comprising refining the information based on at least one other indication received via a different virtual keyboard.

13. The computer-readable storage medium of claim 10, further comprising refining the information based on target data from an advertiser.

14. The computer-readable storage medium of claim 10, further comprising refining the information based on one or more user preferences, user history, or tracking data.

15. The computer-readable storage medium of claim 10, further comprising receiving a next indication of a selection of a next advertisement of the one or more advertisements, wherein the information is refined based on each indication to increase the likelihood that the information sent for display at the virtual keyboard targets the user.

16. The computer-readable storage medium of claim 10, further comprising sending for delivery to a first device information based on the selection of the one or more advertisements at a virtual keyboard of a second device.

17. A virtual keyboard advertisement device for displaying advertisements, comprising:
a display;
a virtual keyboard having a plurality of virtual keys;
means for storing one or more advertisements and instructions; and
a CPU to receive instructions for sending the one or more advertisements to a position of the display proximate to at least one of the plurality of keys, wherein the CPU:
initiates a first action based on a gesture-based selection of the at least one of the plurality of keys proximate to the one or more advertisements, and
initiates a second action based on a non-gesture-based selection of the at least one of the plurality of keys proximate to the one or more advertisements, wherein the first action is associated with displaying the one or more advertisements, and wherein the second action triggers the display of a symbol, character, or alphanumeric value corresponding to the at least one of the plurality of virtual keys.

18. The virtual keyboard advertisement device of claim 17, wherein the first action causes a plurality of the one or more advertisements to appear to shuffle on the display.

19. The virtual keyboard advertisement device of claim 17, wherein the first action causes a new advertisement to appear on the display, wherein the new advertisement is targeted to a user based on the gesture-based selection of the one or more advertisements.

20. The virtual keyboard advertisement device of claim 17, further comprising displaying a targeted advertisement based on data aggregated from navigating one or more online sources using the virtual keyboard.

21. The virtual keyboard advertisement device of claim 17, further comprising a projection component, wherein the projection component is configured to display the virtual keyboard as a 2D or pseudo 3D image projected on a surface.

* * * * *